United States Patent [19]

Anderson, II

[11] Patent Number: 5,324,467
[45] Date of Patent: Jun. 28, 1994

[54] PROCESS FOR PREPARATION OF ORIENTED MULTILAYER LAMINATE FILM

[75] Inventor: Harry S. Anderson, II, Elkton, Md.

[73] Assignee: Hercules Incorporated, Wilmington, Del.

[21] Appl. No.: 973,813

[22] Filed: Nov. 9, 1992

Related U.S. Application Data

[62] Division of Ser. No. 411,283, Sep. 22, 1989, abandoned.

[51] Int. Cl.$^5$ .................................................. B29C 55/12
[52] U.S. Cl. ............................. 264/171; 156/244.11; 264/83; 264/210.7; 264/235.8; 264/290.2
[58] Field of Search ............... 264/171, 173, 512, 514, 264/290.2, 235.8, 210.7, 83; 156/244.11

[56] References Cited

U.S. PATENT DOCUMENTS

| | | | |
|---|---|---|---|
| 3,519,531 | 7/1970 | James et al. | 161/254 |
| 3,853,661 | 12/1974 | Sudo | 264/514 |
| 3,925,591 | 12/1975 | Breitenfellner et al. | 428/483 |
| 4,188,443 | 2/1980 | Mueller et al. | 428/216 |
| 4,243,724 | 1/1981 | Strutzel et al. | 428/474.7 |
| 4,274,900 | 6/1981 | Mueller et al. | 156/229 |
| 4,309,466 | 1/1982 | Stillman | 428/35 |
| 4,352,849 | 10/1982 | Mueller | 428/213 |
| 4,486,507 | 12/1984 | Schumacher | 428/476.1 |
| 4,501,797 | 2/1985 | Super et al. | 428/349 |
| 4,501,798 | 2/1985 | Koschak et al. | 428/349 |
| 4,716,061 | 12/1987 | Winter | 428/35 |
| 4,720,425 | 1/1988 | Hattori et al. | 428/340 |
| 4,734,331 | 3/1988 | Giles, Jr. et al. | 428/412 |
| 4,741,957 | 5/1988 | Park | 428/349 |
| 4,777,081 | 10/1988 | Crass et al. | 264/176.1 |
| 4,874,656 | 10/1989 | Rantanen | 428/483 |
| 4,877,662 | 10/1989 | Yazaki et al. | 428/36.7 |
| 4,980,210 | 12/1990 | Heyes | 428/35.9 |
| 5,089,308 | 2/1992 | Nordness et al. | 264/171 |
| 5,096,630 | 3/1992 | Bothe et al. | 264/290.2 |
| 5,149,389 | 9/1992 | Heyes et al. | 156/272.4 |
| 5,152,946 | 10/1992 | Gillette | 264/230 |

FOREIGN PATENT DOCUMENTS

| | | | |
|---|---|---|---|
| 0056323 | 1/1982 | European Pat. Off. | |
| 0220619 | 10/1986 | European Pat. Off. | |
| 0220620 | 10/1986 | European Pat. Off. | |
| 0220621 | 10/1986 | European Pat. Off. | |
| 2504322 | 8/1975 | Fed. Rep. of Germany | 264/173 |
| 56-27328 | 3/1981 | Japan | 264/512 |
| 61-8328 | 1/1986 | Japan | 264/514 |
| 1231569 | 5/1971 | United Kingdom | |
| 1415686 | 11/1975 | United Kingdom | 264/171 |

OTHER PUBLICATIONS

Abstract of EP Application 220619.
Abstract of EP Application 220620.
Abstract of EP Application 220621.

*Primary Examiner*—Jeffery Thurlow
*Attorney, Agent, or Firm*—Mark D. Kuller; David Edwards

[57] ABSTRACT

A process for the preparation of an oriented multilayer laminate film having at least three layers, said method including: (a) extruding in a molten state (i) polypropylene selected from a homopolymer or a copolymer of propylene wherein said copolymer comprises an alkene monomer having 2 or 4-6 carbons; (ii) adhesive; and (iii) co-polyester of a polyesterification reaction product where the reactants are at least one glycol and at least one dibasic acid with the total reactants being at least three of the glycols and dibasic acids, (b) laminating (i), (ii) and (iii) together in the molten state to form the film; (c) cooling the film; (d) drawing the film in a temperature range that allows orienting without breaking; and (e) heat setting the oriented film.

37 Claims, No Drawings

PROCESS FOR PREPARATION OF ORIENTED MULTILAYER LAMINATE FILM

This is a division of application Ser. No. 07/411,283, filed Sep. 22, 1989, now abandoned.

BACKGROUND OF THE INVENTION

This invention relates to an oriented multilayer structure of polypropylene (referred to as PP) and a co-polyester laminated together with an adhesive and a method for making such structure.

The general foods packaging industry is forever looking for the perfect film that has excellent sealability to itself or to other films, has excellent bonding capabilities to such materials as films, vacuum deposited metals, inks, and adhesives, has excellent optical properties yielding high gloss, low haze, and high clarity, and has improved barrier properties yielding low gas transmission to gases such as air, nitrogen, carbon dioxide and hydrocarbons. Many attempts have been made to produce such a film based on single layer or multiple layer structures. Many conventional, single and multiple layer structures have been used with a moderate degree of success, such as saran-coated polypropylene, glassine, and the like. A critical characteristic that needs the greatest attention is the barrier properties. This characteristic is important because in supermarket type stores, where there are many types of products from foods to hardware, it is easy to contaminate a food product such as potato chips with a pungent odor from a soap or solvent that may be placed next to it.

Prior to the present invention, numerous multilayer films were developed for use in the packaging industry to create a film having the above mentioned desired properties. U.S. Pat. No. 4,501,797 discloses a multilayer film for use in the packaging industry comprising five layers of a polypropylene layer, an adhesive layer of anhydride modified polypropylene, a barrier layer of ethylene vinyl alcohol copolymer or nylon, a heat sealable layer, and a sealant layer. It is disclosed that this film is economically competitive to make and has a combination of attributes including, as functional physical properties, high barrier to gaseous transmission through the film, and as perceived properties, high gloss, transparency, and stiffness.

U.S. Pat. No. 4,501,798 discloses a film material having seven layers wherein the first three layers are a nylon, the fourth layer is an adhesive layer, the fifth layer is a polyethylene or a blend of ethylene polymers, the sixth layer is an adhesive layer and the seventh layer is a sealant layer. This patent also discloses that in another embodient the first three layers are a single layer of nylon. It is disclosed that this film is adapted for use in conventional packaging equipment to economically package a variety of products.

U.S. Pat. No. 4,352,849 discloses a co-extruded, heat-shrinkable, multilayer polyolefin packaging film having a core layer of ethylene vinyl acetate copolymer blended with ethylene propylene copolymer sandwiched between thin layers of copolymer of propylene. It is disclosed that this multilayer of polyolefin film has shrink tensions approximating those of polyvinyl chloride (PVC) films, has good optical qualities, has a wide shrink temperature range, has sealability, has resistance to tear propagation properties, and has none of the undesirable qualities of PVC film such as noxious odors and corrosive by-products.

European Patent Office publications (EP220619-A, EP220620-A, and EP220621-A) disclose biaxially drawn, co-extruded polypropylene film laminates of 3-5 layers containing a co-polyester layer of terephthalic acid, isophthalic acid, ethylene glycol, or butane diol where the carboxylic acids can contain additional functional groups to improve bonding between the layers. The laminates can also contain heat or cold sealable layers and a silicone layer.

None of the prior art discloses the present invention.

SUMMARY OF THE INVENTION

The present invention is directed to a multilayer of polymeric film comprising a polypropylene (PP) layer and a co-polyester layer laminated together with an adhesive layer, wherein the polypropylene layer is a homopolymer or a copolymer of propylene containing an alkene monomer of 2 and 4 to 6 carbons, the co-polyester layer is a polyesterification reaction product of at least three components of at least one glycol and at least one dibasic acid, and the adhesive layer is a polar modified polyolefin wherein the modifier is selected from acrylates, acetates, anhydrides, acids, esters, or blends thereof, and the film is stretched uniaxially or biaxially from 3 to 10 times in each direction in a temperature range that allows stretching without breaking.

This invention also comprehends a method of making the above mention multilayer polymeric film by co-extruding the three layers together, biaxially orienting the co-extruded product, and optionally metallizing the side having the co-polyester layer. In the alternative, the adhesive and co-polyester layers can be sequentially extruded onto the polypropylene layer before or after orientation or the co-polyester layer can be sequentially extruded onto the polypropylene and adhesive laminate to obtain the final extruded product which then can be oriented and further processed for the particular end use, if desired, such as adding a sealant layer to the polypropylene layer or a metal layer to the co-polyester layer.

DETAILED DESCRIPTION OF THE INVENTION

The composite film of the instant invention of polypropylene adhered to a co-polyester film structure can contain other layers on either of the outer surfaces which may include regrind, bonding layers, other barrier layers, or other heat-sealed layers. For example, coating polyvinylidene chloride on the polypropylene side will yield a structure with high oxygen barrier that can be sealed one side to the other without causing a jaw sticking. Vapor depositing metal such as aluminum onto the co-polyester surface will yield a film with high oxygen barrier with improvement of 10–100 times over metallized oriented polypropylene film.

The polypropylene layer in the instant invention is comprised substantially of propylene monomer. It may be a polypropylene homopolymer or a copolymer containing propylene monomer with another alkene of 2 and 4–6 carbons such as ethylene, butene, pentene, 1,4 methyl pentene, and the like. This polypropylene layer may include blends of other polyolefins therein, recycle of other polymers contained in the structure, and hard resins. The polypropylene layer may include inorganic fillers such as calcium carbonate, clay, or organic fillers that are incompatible with the polymer so that upon orienting, voids are initiated in the polypropylene layer providing opacity. Other additives may be included in the polypropylene to provide additional property enhancement such as slip agents, antiblock agents, pigments, orientation stress modifiers, stabilizers, antiacids, radiation stabilizers, flame retardants, antistat agents, and antifog agents. A preferred copolymer is propylene ethylene copolymer having 2-4% ethylene monomer.

The adhesive layer is a thermoplastic adhesive resin that is a polar modified polyolefin. Typical polar modifiers include one or more of the acrylates, acetates, anhydrides, acids, and esters. Representative modifiers include methyl acrylate, methyl methacrylate, ethyl acrylate, glycidyl methacrylate, butyl acrylate, 2-hydroxy ethylacrylate, vinyl acetate, maleic anhydride, acrylic acid, maleic acid, methacrylic acid, diethyl maleate, nonethylmaleate, and the like. These modifiers may be reacted with -olefins containing 2-10 carbons directly or by grafting. Generally, the polar modifier content may be between 0.01% and 30%, preferably between about 0.1% and 15%. Copolymers containing acids may be partially neutralized with metal salts to yield ionomers.

The preferred modifiers are acrylates and anhydrides. For example, EMA 2205 product marketed by Dow Chemical Company is a copolymer of ethylene and methyl acrylate and CXA 3101 product is an anhydride modified ethylene vinyl acetate marketed by Du Pont Corporation. In the case of grafted polymers, the base polyolefin is preferably polypropylene, polyethylene, or a propylene-ethylene copolymer. The adhesive resin may be a blend of various polar modified resins or a blend with other polyolefins or with co-polyesters. Blending may improve properties such as strength, cost, optics, processing, and the like.

The co-polyesters are produced by the polyesterification reaction between diacids and dioles. In this polyesterification reaction more than one glycol and/or more than one dibasic acid are used. In other words, at least 3 components are used in the reaction; there can be 2 glycols and 1 dibasic acid or 1 glycol and 2 dibasic acids at the least. Obviously, 2 glycols and 2 acids or 3 glycols and 2 acids, with many different and additional permentations being possible that would be obvious to a person in the art, can also be used. The limitation of the possibilities will be determined by the diminishing of returns based on the number of reactants. The results in such a polyesterification is that the backbone of the polymer that is produced has an irregular pattern of moieties attached to the backbone than in a monopolyester chain and may have a lower tendency to crystallize.

Representatives of the diacids that can be used to produce the co-polyester include terethalic, isothalic, azelaic, subric, sebacic, adipic, malonic, glutaric, and pimelic acid. Representative glycols include ethylene glycol, butylene glycol, hexamethylene diol, cyclohexanedimethanol, 1,4-butane diol, 1,3 and 1,2 propane diol, butene diol, and other so called polymethylene glycols having 2-10 methylene groups. Preferred co-polyesters of this invention are the ones prepared from terethalic acid, ethylene glycol, and cyclohexane dimethanol which are marketed by the Eastman Corporation under the trademark Kodar PETG and Kodabond. These co-polyesters are molten at temperatures below 160° C.

The multilayer laminant casting of the instant invention can be oriented in single or multiple stages in one or more directions. Typically, it is oriented simultaneously in two directions or sequentially first in the machine direction and then in the transverse direction. The films are drawn (stretched) at 3-10 times over any temperature range that allows stretching without breaking; this temperature range is normally 80° to 165° C, preferably 120° to 160° C. In the final multilayer laminate, the polypropylene layer is about 20-200 gauge (ga) thick, preferably about 60-120 ga thick; the adhesive layer is about 1-10 ga thick, preferably about 2-5 ga thick; the co-polyester layer is about 4-50 ga thick, preferably about 15-25 ga thick. The total overall thickness of the final multilayer laminate is about 40-260 ga, preferably 70-140 ga.

In the method of preparing the oriented multilayer film of the present invention, thermoplastic particles of polypropylene, adhesive and co-polyester are continually and separately extruded at temperatures high enough to be molten but low enough to prohibit degradation, typically 220° C. to 240° C. In the case of using co-extrusion, all three layers are combined in layers in a die, formed into a casting, and quenched to the solid state (usually to about 60° C. or less). This casting is drawn uniaxially in the machine direction by reheating to between 80° C. and 160° C. and stretching 3 to 10 times between rolls turning at different speeds. The resulting uniaxially oriented film is then oriented in the transverse direction by heating to 120° C. to 165° C. in an air heated oven and stretching 5 to 10 times between diverging clips in a tenter frame.

Alternately, the two direction stretching may take place simultaneously in which case the preferred orientation is about 7 times in each direction. The oriented film is cooled to near ambient temperature. Subsequent film operations may then be applied such as corona treatment and metalization. In the case of extrusion coating, the 3 layers of polypropylene, adhesive, and co-polyester are brought together in stages rather than through the same die. Here the polypropylene or polypropylene and adhesive, along with other extra layers, are cast initially. Then the co-polyester is extrusion coated onto the initial casting. This extrusion coating step may occur prior to MD orientation or after MD orientation.

If desirable, the oriented composite laminate is coated on the co-polyester surface with a metal such as aluminum, copper, silver, or gold using conventional metalizing techniques. The metal coating can be applied to the co-polyester layer by first corona treating the co-polyester surface and then applying the metal coating by any known method such as sputtering, vacuum deposition, or electroplating. Vacuum deposition is a preferred method.

If desirable, other layers may be added to the three layer composite laminate, such a sealant layer on the polypropylene layer, another adhesive and co-polyester layer, or any other material depending on the particular end use. The outer surface on the polypropylene side may be laminated to a layer of cellulosic paper.

EXAMPLE 1

In this example, a 3 layer, 3 component biaxially oriented film comprised of a PP, an adhesive, and a co-polyester was prepared using extrusion coating. A 22 mil sheet of PP homopolymer, at a melt temperature of 240° C., was cast onto a cool metal drum. A molten adhesive layer of Bynel 3101 adhesive was extrusion coated onto this PP sheet at a melt temperature of 220° C. and an approximate thickness of 1 mil. Bynel 3101 adhesive is an ethylene vinyl acetate copolymer modified with anhydride, having a melting point of 87° C. and density of 0.943 g/cc. Finally, onto this 2 layer sheet of PP and adhesive, was extrusion coated a 2 mil layer of Kodar 6763 co-polyester at a melt temperature of 246° C. This 3 layer, 25 mil, composite sheet of PP, adhesive, and co-polyester was subsequently biaxially stretched on a T. M. Long stretcher. Stretching conditions were 145° C. with a 30 second preheat and a mechanical extension ratio of 6 times in both directions. Following the complete stretching the film was heatset by allowing it to relax 10% in both directions at the 145° C. stretching conditions. The resulting film was uniform in thickness, indicating uniform stretching. It was optically transparent and exhibited strength and elongation properties characteristic of oriented PP films.

EXAMPLE 2

In this example, a 3 layer 3 component biaxially oriented film comprised of a PP, an adhesive, and a co-polyester was produced using co-extrusion. A co-extruded composite casting of about 23 mils was prepared by combining 3 molten polymer streams in a Cloeren 3 layer coex die. The first layer was a co-polyester of Kodar 6763 extruded at 240° C. and a final thickness of 2 mils. The second layer was an adhesive of Bynel 3101 between the co-polyester and PP, extruded at 220° C. and a final thickness of 1 mil. Finally the third layer was Profax 6523 polypropylene homopolymer extruded at 238° C. and a final thickness of 20 mils. The 3 layer die temperature was controlled at 230° C. The casting roll temperature was set at 22° C. This casting was subsequently oriented in 2 simultaneous directions using the same technique as described in Example 1. As with Example 1, the resulting film was clear and uniform. Tests were made on the film to characterize optics, physical properties, sealability and printability. The optics of the film were surprisingly excellent with a haze of 1.1%, a clarity of 80%, and a gloss on the co-polyester side of 99%. The high gloss is of particular interest in providing visual impact and for providing a very smooth surface. The co-polyester side of the film was found to have good sealability. Strong seals were obtained at temperatures of 104° C. or higher as shown in Table I.

TABLE I

| TEMPERATURE OF SEALING | PEAK LOAD | FAILURE MODE |
| --- | --- | --- |
| 99° C. | 56 g/in | 100% PEEL |
| 104° C. | 379 g/in | 40% FILM BREAK |
| 110° C. | 354 g/in | 80% FILM BREAK |
| 115° C. | 406 g/in | 60% FILM BREAK |

The ability of the co-polyester to seal to polyvinylidine chloride copolymer latex coated films such as Hercules CB film was tested. Surprisingly, the co-polyester side of this composite film was found to have excellent seals of 350 g/in at 104° C.

The shrinkage of the film was measured as shown in Table II.

TABLE II

| TEMPERATURE | MD SHRINK | TD SHRINK |
| --- | --- | --- |
| 120° C. | 1% | 1% |
| 140° C. | 9% | 7% |

Samples of the oriented film were corona treated on the co-polyester side at a power level of 3.0 watts/sq. ft./min. The printability of this surface was tested by examination of ink adhesion using nitrocellulose based inks. 100% adhesion of an ink containing 30% nitrocellulose was obtained. This level of adhesion indicates that the film will perform well in subsequent converting steps such as printing and laminating.

The permeability of these composite PP/adhesive/co-polyester films was measured to see if the polyester layer added barrier properties especially to typical printing solvents. As shown in the table below the barrier properties were improved by about two orders of magnitude.

| Permeability (micro gr.-cm/sq. cm./sec/cm Hg)* | | |
| --- | --- | --- |
| Vapor | PP/And/polyester | PP control |
| MEK | 1.5–1.7 E-7 | 0.8 E-6 |
| Toluene | 0.9–1.7 E-7 | 1 E-5 |

*measured at 41° C. and 25 mg concentration

EXAMPLE 3

The film of Example 2 was vacuum metalized with aluminum on the co-polyester side following corona treatment. Vacuum metalization was accomplished using standard methods which include placement of the film on a surface cooled to room temperature inside a vessel evacuated to a pressure of about 0.00001 torr and evaporating aluminum metal over the film at a distance of about 12 inches from the film surface, and allowing the aluminum vapor to condence on the film surface. The aluminum layer was allowed to build until the surface resistivity was 2 ohms/sq.. This yielded films with optical densities of 3.5. The very high surface smoothness and hence gloss of the copolyester provides a surface that yields a pinhole free aluminum layer. As a result, the barrier of the metalized film to gas such as oxygen is much improved over a composite film without the co-polyester layer as shown in Table III.

TABLE III

| FILM STRUCTURE METALIZED | OXYGEN FLUX (cc/sq. meter/day/atmos) |
| --- | --- |
| PP/PP/PP | 31 |
| PP/adhesive/co-polyester | 2.6 to 6.7 |

EXAMPLE 4

A 5 layer biaxially oriented film was produced using sequential orientation on a tenter. The 5 layer casting was extruded from a 5 layer die with a co-polyester core layer, polypropylene homopolymer outer layers and adhesive layers between the polyester and polypropylene. The co-polyester layer was Kodar 6763. The adhesive layer was Bynel E304, an anhydride modified co-polymer of ethylene and propylene. The casting was quenched on a 45° C. chrome plated roll. It was drawn between 4 and 5 times in the machine directions between two rolls at a temperature of 120° C. It was subsequently oriented 9 times in the transverse direction at a temperature of about 160° C. The final film thickness was about 110 ga. with a 20 ga co-polyster layer, adhesive layers of 4 ga each and the balance polypropylene. The film showed excellent optical properties and improved gas barrier over a control film of the same structure without the co-polyester as shown below.

|  |  | Example | Control |
| --- | --- | --- | --- |
| Haze |  | 1.0% | 1.6% |
| Clarity |  | 76% | 76% |
| Gloss |  | 94% | 92% |
| Tensile Strength | MD | 15400 psi | 15700 psi |
|  | TD | 40700 psi | 44500 psi |
| Modulus | MD | 360000 psi | 369000 psi |
|  | TD | 720000 psi | 739000 psi |
| Elongation | MD | 214% | 212% |
| Oxygen barrier* |  | 26 | 100 |

*(cc/100 in sq./day/atmos. at 23° C. and 0% RH)

EXAMPLE 5

A 4 layer oriented film containing PP and co-polyester was produced using co-extrusion and extrusion coating on a tender. A 3 layer casting was prepared by combining 3 molten streams of 1) ethylene-propylene random copolymer containing about 6-7% ethylene, 2) PP homopolymer, and 3) a malaic anhydride grafted polyolefin of Modic P300M containing 0.2% of a 2-3 micron silica. This co-extrusion was quenched at 45° C. on a chrome plated roll and oriented 5 times in the machine direction at 80° to 100° C. Onto this uniax oriented web was extrusion coated a molten layer of Kodar 6763 co-polyester at a melt temperature of 220° C. This extrusion coated uniax was subsequently oriented in-line in the traverse direction 9 times at a temperature of 165° C. The resulting film had a thickness of about 100 ga with the co-polyester layer comprising 20 ga., the ethylene propylene random copolymer comprising 6 ga., the adhesive layer comprising about 4 ga. and the PP the remaining. This film has excellent optical and physical properties as indicated below:

|  |  | Example | Control |
| --- | --- | --- | --- |
| Haze |  | 1.5% | 6.7% |
| Clarity |  | 69% | 53% |
| Gloss |  | 99% | 73% |
| Tensile Strength | MD | 17300 psi | 20800 psi |
|  | TD | 34200 psi | 38500 psi |
| Modulus | MD | 336000 psi | 367000 psi |
|  | TD | 621000 psi | 745000 psi |
| Elongation | MD | 166% | 162% |
| Oxygen barrier* |  | 36 | 100 |

*(cc/100 in sq./day/atmos. at 23° C. and 0% RH)

EXAMPLE 6

In this example, 4 different adhesive polymers were tried as bonding layers between the PP and the co-polyester layers. The films were produced by extruding a 20 mil casting of hard resin modified PP homopolymer at a temperature of 470° F. (243.3° C.) on to a quench drum set at 35° C. This casting was extrusion coated with 1 mil of adhesive as shown in the table below. Next, a 1 mil layer of Kodar 6763 was extrusion coated at about 450° F. (232.2° C.) onto the adhesive layer of the casting. Finally, an ethylene-propylene random copolymer containing about 6% ethylene was extrusion coated at 470° F. (243.3° C.) onto the PP side of the 3 layer casting at a thickness of 1.33 mils. This 4 layer casting of about 23 mils thick was biaxially oriented on a T. M. Long Stretcher at a stretch ratio of 6 in each direction at a temperature of 145° C. It was allowed to relax 10% in each direction at 145° C. to heatset and reduce shrinkage. This oriented film was cooled to room temperature. The co-polyester side was corona treated at 3.0 watts/min/sq. ft. at a temperature of 80° C. The co-polyester side was then vacuum metalized to a surface resistivity of 2.0 ohm/sq. surface resistivity. All 4 films showed good appearance and good interlaminar adhesion as evidenced by the inability to separate the layers. These 4 films were subsequently adhesive laminated to a 70 ga OPP film (HST 622/ls) using molten polyethylene extruded at 620° F. (326.7° C.) at a coat weight of 10 lbs/ream and 0.5 lbs/linear inch tension with the metalized film on the rubber roll of the laminator. Bond strengths of the extrusion lamination are shown below.

| ADHESIVE TYPE | MELT TEMP OF ADHESIVE | EXTRUSION LAMINATION BONDS WITH HST | |
| --- | --- | --- | --- |
|  |  | MD (PEAK/ PEEL/MODE) | (TD PEAK/ PEEL/MODE) |
| 1 BYNEL 3101[a] | 450° F. (232.2° C.) | 310/202/75% ML | 249/153/100% ML |
| 2 BYNEL E319[b] | 450° F. (232.2° C.) | 180/154/20% ML | 288/230/50% ML |
| 3 BYNEL E301[c] | 470° F. (243.3° C.) | 57/40/100% ML | 105/43/PE-HST |
| 4 BYNEL E305[d] | 470° F. (243.3° C.) | 10/6/100% ML | 27/8/PE-HST |

[a]The Bynel 3101 is an anhydride modified ethylene vinyl acetate copolymer with a melting point of 87° C.
[b]The Bynel E319 is a anhydride modified ethylene methyacrylate copolymer.
[c]The Bynel E301 is a anhydride modified homopolymer PP with a melting point of 161° C.
[d]The Bynel E305 is a anhydride modified ethylene propylene copolymer with a melting point of 138° C.

EXAMPLE 7

A three layer co-extruded oriented film was produced to examine the effect of adhesive types. Here a 3 layer co-extrusion was produced with an 18 mil layer of hard resin modified PP extruded at a metal temperature of 470° F. (243.3° C.), a 1.5 mil layer of adhesive as shown in the following table, and a 1.5 mil layer of Kodar 6763 co-polyester extruded at 450° F. (232.2° C.). This 3 layer melt was quenched on a chill roll controlled at 35° C. It was oriented in a T. M. Long Stretcher at a stretch ratio of 6 times in two directions at a temperature of 145° C. It was relaxed 10% at 145° C. to heatset, producing a final film of 71 ga. This was corona treated at 3.0 watts/min/sq. ft. at a temperature of 80° C. and subsequently vacuum metalized with aluminum to a 2.0 Ohm/sq surface resistivity. These films were extrusion laminated with molten polyethylene as in Example 6. Extrusion lamination bond strengths are shown below with the metalized film on both the laminator chill roll and the rubber backup roll.

| ADHESIVE TYPE | MELT TEMP OF ADHE-SIVE | EXTRUSION LAMINATION BONDS WITH HST | |
|---|---|---|---|
| | | MD (PEAK/PEEL/MODE) FILM ON CHILL ROLL | TD PEAK/PEEL/MODE) FILM ON RUBBER ROLL |
| 1 BYNEL 3101 | 450° F. (232.2° C.) | 328/174/ ML | 502/279/PE LIFT |
| 2 BYNEL E319 | 485° F. (251.7° C.) | 280/1812/ML | 326/159/ML |
| 3 BYNEL E301 | 485° F. (251.7° C.) | 51/25/ ML | 106/91 ML |
| 4 BYNEL E305 | 485° F. (251.7° C.) | 17/12/ ML | 19/10 ML |

What is claimed:

1. A process for the preparation of an oriented multilayer laminate film having at least three layers, said process comprising:
   (a) extruding either separately or together in a molten state (i) polypropylene selected from a homopolymer or a copolymer of propylene and wherein said copolymer comprises an alkene monomer having 2 or 4-6 carbons, (ii) adhesive of a polar modified polyolefin, and (iii) co-polyester of a polyesterification reaction product where the reactants are at least one glycol and at least one dibasic acid with the total reactants being at least three of the glycols and dibasic acids,
   (b) laminating (i), (ii) and (iii) together in the molten state to form the film, the film having the adhesive layer located between the polypropylene and co-polyester layers;
   (c) cooling the film;
   (d) drawing the film, either uniaxially or biaxially, sequentially or simultaneously, from 3 to 10 times in each direction in a temperature range that allows drawing without breaking; and
   (e) heat setting the oriented film.

2. A process for the preparation of an oriented multilayer laminate film having at least three layers, said method comprising:
   (a) extruding in a molten state
      (i) polypropylene selected from a homopolymer or a copolymer of propylene wherein said copolymer comprises an alkene monomer having 2 or 4-6 carbons;
      (ii) adhesive; and
      (iii) co-polyester of a polyesterification reaction product where the reactants are at least one glycol and at least one dibasic acid with the total reactants being at least three of the glycols and dibasic acids,
   (b) laminating (i), (ii) and (iii) together in the molten state to form the film, the film having the adhesive layer located between the polypropylene and co-polyester layers;
   (c) cooling the film;
   (d) drawing the film in a temperature range that allows orienting without breaking; and
   (e) heat setting the oriented film.

3. The process of claim 2 wherein extruding of said polypropylene particles, adhesive particles and co-polyester occurs either separately or together.

4. The process of claim 2 wherein the adhesive particles are of a polar modified olefin.

5. The process of claim 2 including drawing film either uniaxially or biaxially, sequentially or simultaneously.

6. The process of claim 2 including optionally adding additional layer(s) as required by the particular end use.

7. The process of claim 2 further comprising coating on the co-polyester layer a metal layer, said metal being selected from the group consisting of aluminum, copper, silver and gold.

8. The process of claim 2 wherein the polypropylene particles are a polypropylene copolymer containing inorganic filler.

9. The process of claim 2 wherein the adhesive particles comprises a copolymer of ethylene and methyl acrylate.

10. The process of claim 2 wherein the co-polyester layer is the reaction product of terephthalic acid, ethylene glycol and cyclohexanedimethanol, said product being molten at a temperature below 160° C.

11. The process of claim 2 wherein the adhesive particles are a reaction product of an olefin of 2-10 carbon atoms and a modifier selected from the group consisting of methyl acrylate, methyl methacrylate, ethyl acrylate, glycidyl methacrylate, butyl acrylate, 2-hydroxy ethylacrylate, vinyl acetate, maleic anhydride, acrylic acid, maleic acid, methacrylic acid, diethyl maleate and nonoethyl maleate.

12. The process of claim 2 wherein the outer surface of the external polypropylene layer is laminate to a poly(vinylidene chloride) layer.

13. The process of claim 2 wherein the outer surface on the polypropylene layer is coated with a second multilayer laminate film of a polypropylene layer and a vinylidene chloride polymer layer.

14. The process of claim 2 wherein the outer surface on the polypropylene layer is laminated to a layer of cellulosic paper.

15. The process of claim 2 wherein the (a) external layer comprises a propylene/ethylene copolymer having about 1%-4% ethylene monomer by weight of copolymer.

16. The process of claim 2 wherein the polypropylene particles are a polypropylene copolymer containing inorganic filler; the adhesive particles comprises a copolymer of ethylene and methyl acrylate; and the co-polyester layer is the reaction product of terephthalic acid, ethylene glycol and cyclohexanedimethanol, said product being molten at a temperature below 160° C.

17. The process of claim 11 wherein the polypropylene particles are a polypropylene copolymer containing inorganic filler; the adhesive particles are a reaction product of an olefin of 2-10 carbon atoms and a modifier selected from the group consisting of methyl acrylate, methyl methacrylate, ethyl acrylate, glycidyl methacrylate, butyl acrylate, 2-hydroxy ethylacrylate, vinyl acetate, maleic anhydride, acrylic acid, maleic acid, methacrylic acid, diethyl maleate and nonoethyl maleate; and the co-polyester layer is the reaction product of terephthalic acid, ethylene glycol and cyclohexanedimethanol, said product being molten at a temperature below 160° C.

18. The process of claim 4 wherein the modifier is at least one member selected from the group consisting of acrylates, acetates, anhydrides, acids and esters.

19. The process of claim 18 when the modifier is an acrylate.

20. The process of claim 18 wherein the modifier is an anhydride.

21. The process of claim 2 wherein the co-polyester is the polyesterification reaction product of two glycols and one dibasic acid.

22. The process of claim 11 wherein the film is clear.

23. The process of claim 21 wherein the film is clear.

24. A process for the preparation of an oriented multi-layer laminate film having at least three layers, said method comprising:
 (a) extruding in a molten state
  (i) polypropylene selected from a homopolymer or a copolymer of propylene wherein the copolymer comprises an alkene monomer having 2 or 4-6 carbons;
  (ii) adhesive; and
  (iii) co-polyester of a polyesterification reaction product where the reactants are at least one glycol and at least one dibasic acid with the total reactants being at least three of the glycols and dibasic acids,
 (b) laminating (i), (ii) and (iii) together in the molten state to form the film, the film having the adhesive layer located between the polypropylene and co-polyester layers;
 (c) cooling the film;
 (d) biaxially drawing the film about 6-10 times in each direction in a temperature range that allows orienting without breaking; and
 (e) heat setting the oriented film.

25. The process of claim 24 further comprising coating on the co-polyester layer a metal layer, said metal being selected from the group consisting of aluminum, copper, silver and gold.

26. The process of claim 24 wherein the drawing is at least about 7-10 times in each direction.

27. The process of claim 24 wherein the co-polyester layer is the reaction product of terephthalic acid, ethylene glycol and cyclohexanedimethanol, said product being molten at a temperature below 160° C.

28. The process of claim 24 wherein the co-polyester is the polyesterification reaction product of two glycols and one dibasic acid.

29. The process of claim 24 wherein the film is clear.

30. The process of claim 29 wherein the film is clear.

31. A process for the preparation of an oriented multi-layer laminate film having at least three layers, said method comprising:
 (a) extruding in a molten state
  (i) polypropylene selected from a homopolymer or a copolymer of propylene and wherein the copolymer comprises an alkene monomer having 2 or 4-6 carbons;
  (ii) adhesive; and
  (iii) co-polyester of a polyesterification reaction product where the reactants are at least one glycol and at least one dibasic acid with the total reactants being at least three of the glycols and dibasic acids,
 (b) laminating (i), (ii) and (iii) together in the molten state to form the film, the film having the adhesive layer located between the polypropylene and co-polyester layers;
 (c) cooling the film;
 (d) drawing the film at least about 4-10 times in a machine direction and at least about 9-10 times in a transverse direction in a temperature range that allows orienting without breaking; and
 (e) heat setting the oriented film.

32. The process of claim 31 wherein the drawing is about 5-10 times in the machine direction.

33. The process of claim 31 further comprising coating a metal layer onto the co-polyester layer, said metal being selected from the group consisting of aluminum, copper, silver and gold.

34. The process of claim 31 wherein the co-polyester layer is the reaction product of terephthalic acid, ethylene glycol and cyclohexanedimethanol, said product being molten at a temperature below 160° C.

35. The process of claim 31 wherein the co-polyester is the polyesterification reaction product of two glycols and one dibasic acid.

36. The process of claim 31 wherein the film is clear.

37. The process of claim 35 wherein the film is clear.

* * * * *